(12) United States Patent
Chen et al.

(10) Patent No.: US 11,426,828 B2
(45) Date of Patent: Aug. 30, 2022

(54) METHOD FOR ASSEMBLING DUAL-HEAD PULLING RODS

(71) Applicant: Wenzhou University of Technology, Zhejiang (CN)

(72) Inventors: Haishao Chen, Yueqing (CN); Zhonggen Su, Wenzhou (CN); Shuxin Wang, Zhenjiang (CN)

(73) Assignee: WENZHOU UNIVERSITY OF TECHNOLOGY, Zhejiang (CN)

( * ) Notice: Subject to any disclaimer, the term of this patent is extended or adjusted under 35 U.S.C. 154(b) by 0 days.

(21) Appl. No.: 17/185,971

(22) Filed: Feb. 26, 2021

(65) Prior Publication Data
US 2021/0270031 A1   Sep. 2, 2021

(30) Foreign Application Priority Data

Feb. 28, 2020   (CN) .......................... 202010129205.5

(51) Int. Cl.
| | |
|---|---|
| *B23P 19/00* | (2006.01) |
| *B23P 15/00* | (2006.01) |
| *B23P 19/04* | (2006.01) |
| *B23P 21/00* | (2006.01) |
| *F16C 7/00* | (2006.01) |

(52) U.S. Cl.
CPC ............ *B23P 19/004* (2013.01); *B23P 15/00* (2013.01); *B23P 19/001* (2013.01); *B23P 19/04* (2013.01); *B23P 21/00* (2013.01); *F16C 7/00* (2013.01); *B23P 2700/04* (2013.01)

(58) Field of Classification Search
CPC .................. B23P 2700/04; B23P 15/00; B23P 19/001–002; B23P 19/004; B23P 19/04; B23P 21/00–004; F16C 7/00; F16C 2226/00; F16C 2226/60
See application file for complete search history.

(56) References Cited

U.S. PATENT DOCUMENTS

2009/0250859 A1 *  10/2009  Okumura ............. B23D 31/003
                                                         269/74

FOREIGN PATENT DOCUMENTS

| CN | 109277796 A | * | 1/2019 | ............. B23P 19/00 |
|---|---|---|---|---|
| CN | 109352332 A | * | 2/2019 | ............. B23P 21/00 |
| CN | 109570942 A | * | 4/2019 | ............. B23P 19/00 |

* cited by examiner

*Primary Examiner* — Matthew P Travers
(74) *Attorney, Agent, or Firm* — Leong C. Lei

(57) ABSTRACT

A method for assembling a dual-head pulling rod involves attaching pulling heads to two ends of a rod body through threaded connection using a system that includes a foundation, on which a rod dispensing device, an inclined guiding plate, a conveying flap, a head dispensing device, a head mounting unit, a clamping device, an assembling device and a V-shaped output channel are provided. The inclined guiding plate is inclined and uses its ramp to guide a rod body falling thereon. The conveying flap is swingable between an input position and an output position. The conveying flap at the input position receives the rod body coining from the inclined guiding plate and outputs the rod body to the clamping device.

2 Claims, 7 Drawing Sheets

METHOD FOR ASSEMBLING DUAL-HEAD PULLING RODS

BACKGROUND OF THE INVENTION

1. Technical Field

The present invention relates to a system for assembling dual-head pulling rods and its method.

2. Description of Related Art

Presently, pulling rods are commonly used as tools for tractive connection and for remote connection between two components Pulling rods can also work as building blocks of linkage structures, such as four-linkage structures, extensively used in various areas. However, pulling rods have been manually assembled in the prior art, thus having the disadvantage of low production efficiency. In view of this how to assemble linkage mechanisms in an automated, efficient way is a technical need to be addressed.

SUMMARY OF THE INVENTION

The objective of the present invention is to provide a system for assembling dual-head pulling rods and its method.

In order to address the foregoing need, the present invention implements the technical scheme below:

a dual-head pulling rod assembling system, configured to mount pulling heads at two ends of a rod body of each of the dual-head pulling rods through threaded connection, the system comprising: a foundation, on which a rod dispensing device, an inclined guiding plate, a conveying flap, a head dispensing device, a head mounting unit, clamping devices, an assembling device and a V-shaped output channel are installed;

the rod dispensing device, configured to dispense the rod bodies stored therein one by one by gravity;

the inclined guiding plate, using a ramp thereof to guide the dispensed rod bodies;

the conveying flap, being swingable between an input position and an output position; and configured to, at the tilted-up, input position, receive the rod body from the inclined feeding and output the rod body to the clamping devices and, at the tilted down output position, receive the assembled rod body form the clamping devices and output the rod body to the V-shaped output channel;

the head dispensing device, configured to dispense the pulling heads stored therein one by one by gravity;

the head mounting unit, configured to receive the pulling head dispensed by the head dispensing device and axially push the pulling head to a socket at the corresponding end of the rod body;

the clamping device, horizontally clamping the rod body;

the assembling device, threadedly connecting the pulling head to the in end of the rod body;

the V-shaped output channel, axially advancing the rod body output by the conveying flap to a position for subsequent processing.

As further improvements to the foregoing technical scheme, the system is such configured that:

the rod dispensing device comprises a rod feeding channel, in which the rod bodies are horizontally placed; rod aligning inclines provided at two sides of the lower end of the rod feeding channel; a rod positioning wheel positioned below the lower outlet between the rod aligning inclines; U-shaped feeding notches distributed at the circumference of the rod positioning wheel and configured to receive the rod body coining from the rod feeding channel; rod orienting lateral walls extending from two sides of the rod positioning wheel to the bottom of the rod positioning wheel; a rod orienting falling port located between the rod orienting lateral walls and right below the rod positioning wheel and having a width that is of between one and two times of the diameter of the rod body; and a rod angle sensor deposited on the rod positioning wheel.

The head dispensing device comprises a downward-open head falling channel, in which the pulling heads are placed horizontally; and a head positioning wedge that is installed at the open lower end of the head falling in channel in a horizontally extendable manner for preventing the pulling heads from unintentionally falling down.

The head mounting unit comprises a mounting swing motor installed on the foundation and located below the head positioning wedge; a mounting C-shaped bracket linked to the mounting swing motor and configured to receive the pulling head falling down from the head falling channel; a mounting access and a mounting front port provided on the mounting C-shaped bracket; and an axial pusher axially attached to the mounting C-shaped bracket and configured to axially push the pulling head.

Feeding buffer pads are provided at the bottom of the conveying flap, and a feeding swing gear shaft is installed on the foundation 3 for driving the conveying flap to swing.

The clamping devices, in a number of at least two, each comprise a gripping fixing seat located at the outputting side of the conveying flap; a gripping first oscillating arm having its root hinged to the top of the gripping fixing seat; a first adjusting arm adjustably attached to the gripping first oscillating arm; an upper V-shaped block reversely attached to the below of the end of the first adjusting arm; a lower V-shaped block in paired to the upper V-shaped block from below; a driving shaft installed on the foundation 3 for driving the lower V-shaped block to turn; a second driving arm mounted on the gripping first oscillating arm and having its root hinged to the gripping fixing seat; a third pressing arm having its upper end hinged to the upper end of the second driving arm and located in the chamber of the second driving arm; a gripping third hook attached to the top of the third pressing arm to embrace the hinging shaft of the third pressing arm; a third n-shaped opening provided at the lower end of the third pressing arm, and mounted on the gripping first oscillating arm, with its lower end hinged to the gripping first oscillating arm; a check-mark-shaped trough installed on the gripping first oscillating arm and matching the curved bottom of the third n-shaped opening; a gripping swing seat attaching to the upper end of the second driving arm; a gripping front hooked arm attaching to the gripping swing seat; an upper pressing hand and a lower hooked hand attached to the gripping front hooked arm and located above and below the first adjusting arm, respectively; an orienting sector rack located at one end of the gripping swing seat; and a driving gear shaft engaged with the orienting sector rack.

The upper V-shaped block and the lower V-shaped block are configured to be drawn together to hold the rod body.

When the gripping swing seat swings forward, the upper pressing hands presses the first adjusting arm downward.

When the gripping swing seat swings backward, the lower hooked hand props up to tilt up the first adjusting arm.

The assembling device comprises rotatable push rods located at two ends of the clamping devices; assembling squeezing cylinders radically deposited on the rotatable push rods; and assembling semi-circular jaw halves attached to the assembling squeezing cylinders for holding the pulling head when being drawn together.

An output axial push rod is provided at one end of the V-shaped output channel for pushing out the assembled rod body. An output guide rail is provided at the opposite end of the V-shaped output channel, and output trays are guided by a conveyer/chain so as to move along the output guide rail.

The output trays are for carrying the rod bodies.

a method for assembling dual-head pulling rods is characterized in using a dual-head pulling rod assembling system to mount pulling heads at two ends of a rod body of each of the dual-head pulling rods through threaded connection, the system comprising: a foundation, on which a rod dispensing device, and inclined guiding plate, a conveying flap, a head dispensing device, a head mounting unit, clamping devices, an assembling device and a V-shaped output channel are installed, and the method comprising steps of:

Step 1: the rod dispensing device dispensing the rod bodies stored therein one by one by gravity, and the head dispensing device dispensing the pulling heads stored therein one by one by gravity;

Step 2: the inclined guiding plate using a ramp thereof to guide the dispensed rod bodies;

Step 3: the conveying flap, at a tilted-up input position thereof, receiving and conveying each of the rod bodies guided thereto by the inclined guiding plate to the clamping devices;

Step 4: first, the head mounting unit receiving the pulling heads dispensed by the head dispensing device; then the head mounting unit receiving the rod bodies coming from the conveying flap; secondary, the head mounting unit axially pushing the pulling heads to corresponding sockets inlaid in the ends of each of the rod bodies; and the head mounting unit departing from the pulling heads while the rod body advancing to the clamping devices along the conveying flap;

Step 5: the clamping devices horizontally clamping opposite laterals of the rod body;

Step 6: the assembling device threadedly connecting the pulling heads to the ends of the rod body;

Step 7: the clamping devices releasing the rod body, and the conveying flap, at a tilted-down position thereof, receiving the rod body with the pulling heads attached thereto on the clamping devices and output the rod body to the V-shaped output channel; and Step 8: the V-shaped output channel axially advancing the rod body output by the conveying flap to a position for subsequent processing.

Further improvements to the foregoing technical scheme are:

the Step 1 comprising steps of: first, the rod body being horizontally placed in a rod feeding channel; then a rod positioning wheel being activated, and a rod angle sensor controlling the rod positioning wheel to rotate for an angle, so that the rod body rolls from rod aligning inclines to one of plural U-shaped feeding notches 5; and secondary, the rod body being guided by rod orienting lateral walls to be dispensed through a rod orienting falling port by gravity;

the Step 4 comprising steps of:

Step 41: a swing motor controlling a mounting access to be open upward;

Step 42: a head positioning wedge controlling the pulling heads to be dispensed one by one by gravity to a mounting C-shaped bracket from a head falling channel;

Step 43: the swing motor controlling the mounting access to face a feeding direction of the rod bodies, so that the rod body rolls and falls into the mounting C-shaped bracket;

Step 44: an axial pusher axially pushing the pulling head to the socket in the corresponding end of the rod body;

Step 45: the swing motor controlling the mounting access to face the clamping device; and Step 46: the rod body advancing on the conveying flap to the clamping devices;

the Step 5 comprising steps of:

Step 51: a driving shaft driving a lower V-shaped block to turn to receive the rod body and then turn back; and at Step 52, a driving gear shaft driving an orienting sector rack to swing forward, so that an upper pressing hand presses a first adjusting arm downward, and a gripping swing seat driving a second driving arm to swing and become upright that in turn drives a third pressing arm to swing, such that a third n-shaped opening has a curved bottom thereof sliding along a check-mark-shaped trough until the third n-shaped opening becomes upright, thereby making the upper V-shaped block and the lower V-shaped block horizontally clamp the opposite laterals of the rod body;

at the Step 6, first, an assembling squeezing cylinder drawing two assembling semi-circular jaw halves 5 together to hold the pulling heads; and then a rotatable push rod rotating to threadedly connecting the pulling head to the corresponding end of the rod body;

at the Step 7, first, after the gripping swing seat swings, a lower hooked hand propping up to tilt up the first adjusting arm, and the gripping swing seat driving the second driving arm and in turn the third pressing arm 5 to swing, such that the curved bottom of the third n-shaped opening slides along the check-mark-shaped trough, thereby making the upper V-shaped block and the lower V-shaped block release the rod body; then the driving shaft driving the lower V-shaped block to turn to output the assembled rod body; secondary, the conveying flap, at the tilted-down position thereof, outputting the assembled rod body to the V-shaped output channel; and at the Step 8, first, an output axial push rod axially advancing the rod body from the V-shaped output channel to an output tray; and then a conveyer/chain carrying the output tray to the position for subsequent processing.

The present invention features for reasonable design, low costs, high durability, good safety and reliability, and simple operation, and is advantageous for being time-saving, effort-saving, money-saving, compact and convenient to use.

DETAILED DESCRIPTION OF THE INVENTION

Figure 1:
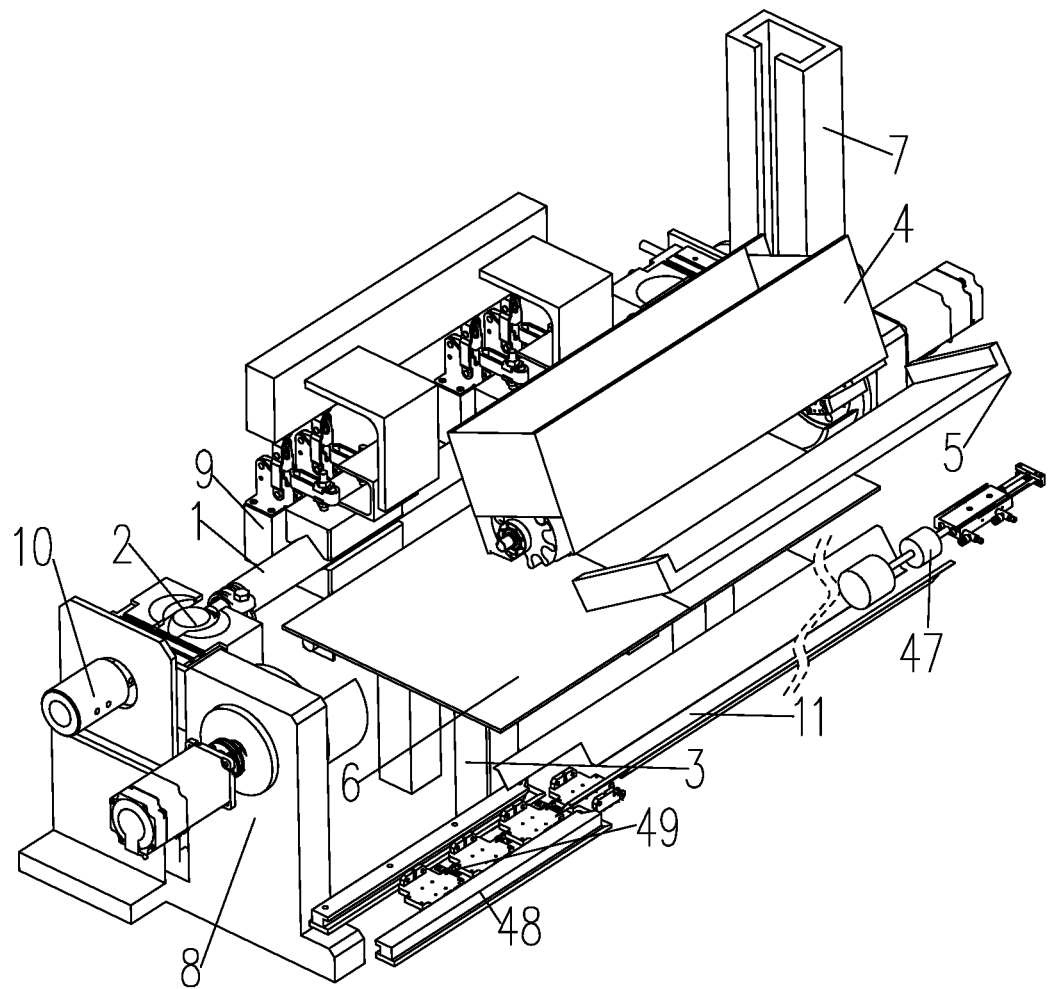
FIG. 1 is a schematic drawing of a system as a whole of the present invention.
Figure 2:
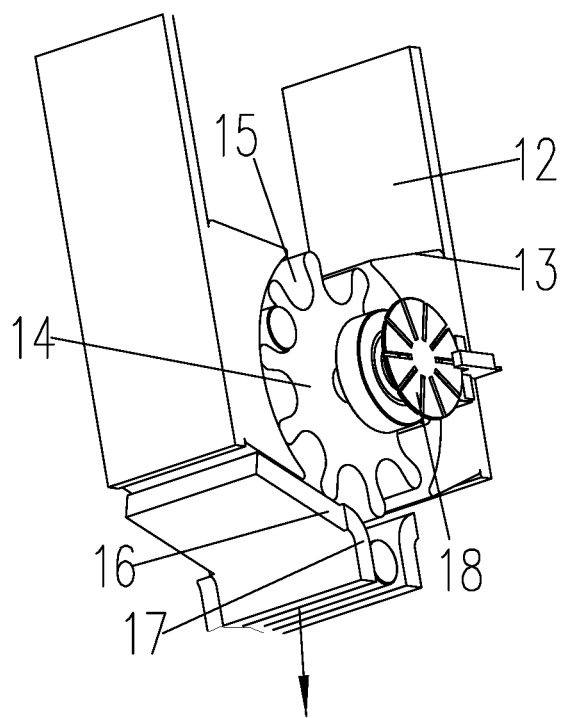
FIG. 2 is a structural illustration of a first component of the present invention.
Figure 3:
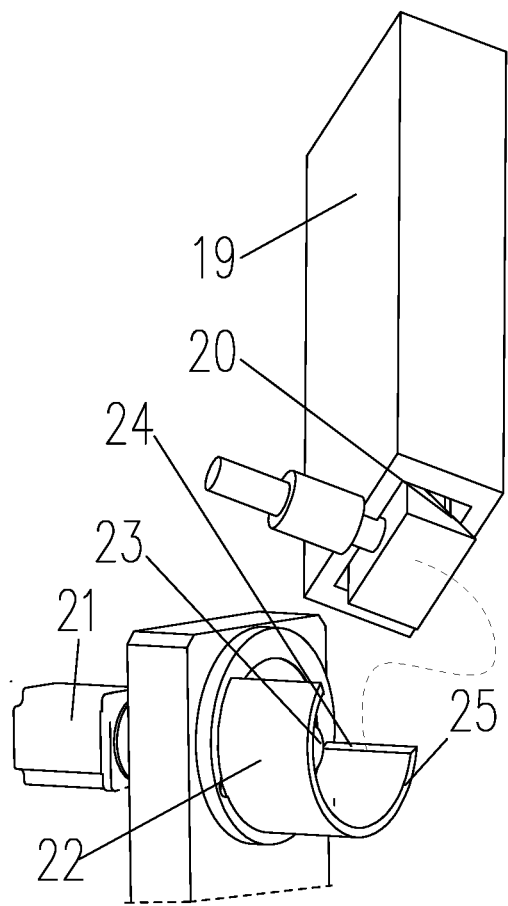
FIG. 3 is a structural illustration of a second component of the present invention.
Figure 4:
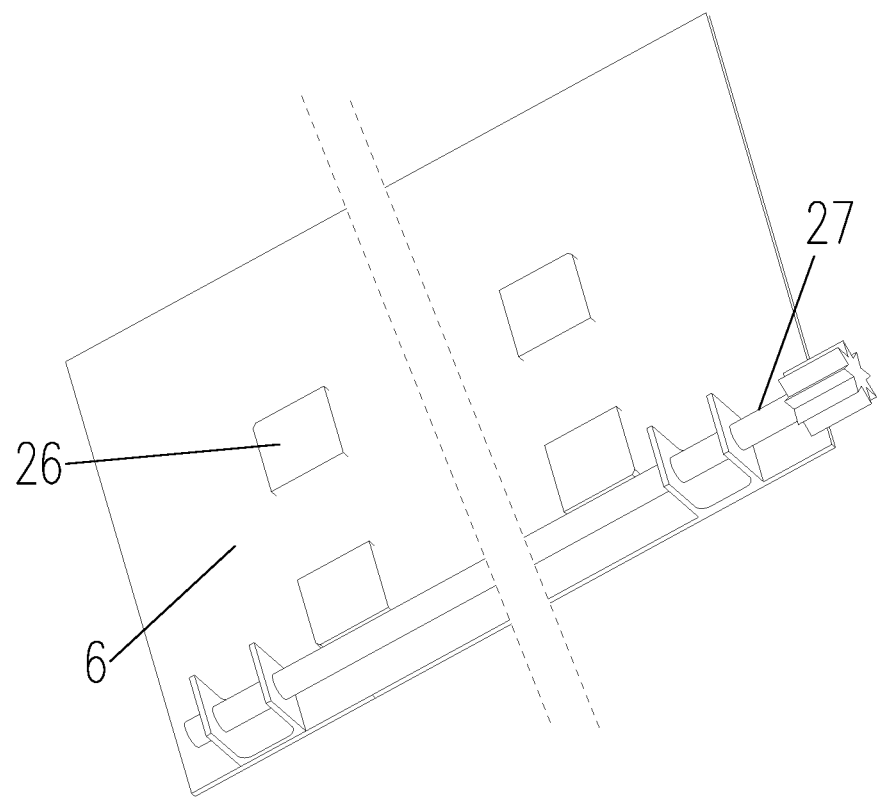
FIG. 4 is a structural illustration of a third component of the present invention.
Figure 5:
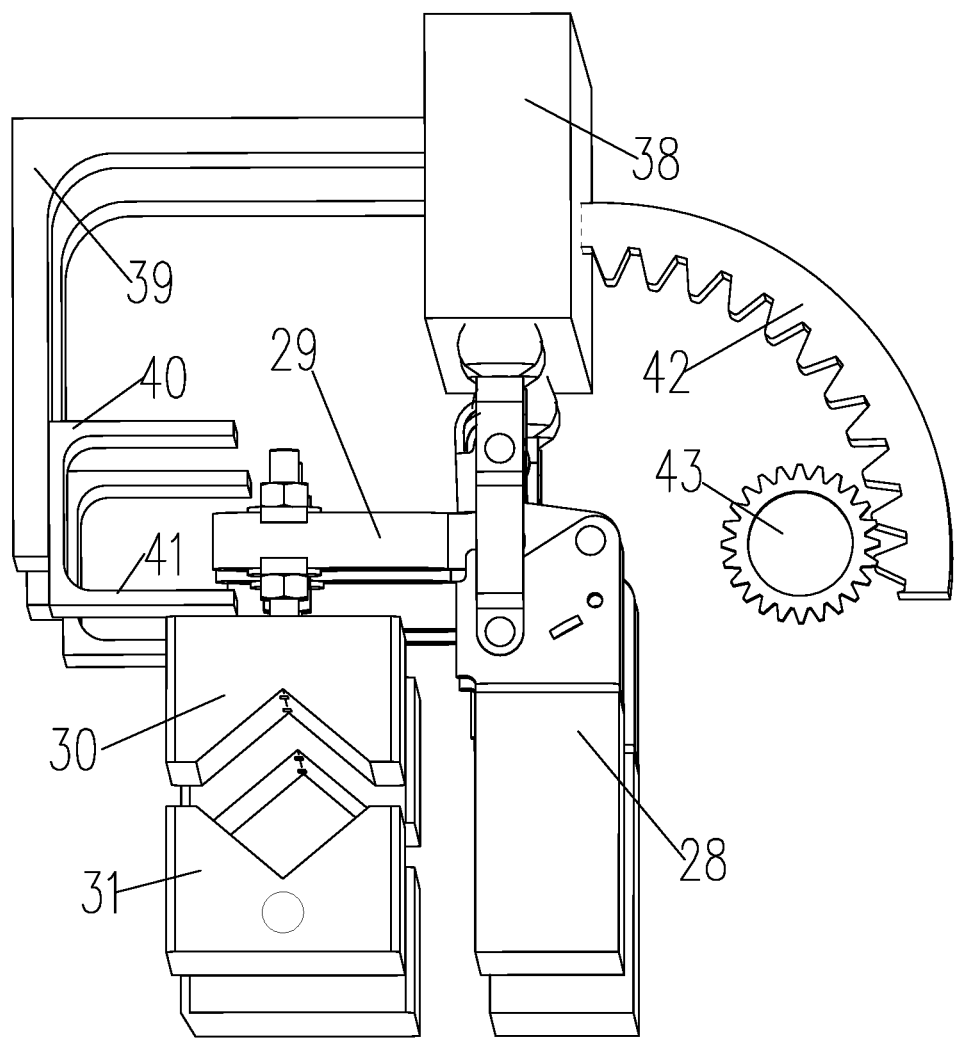
FIG. 5 is a structural illustration of a fourth component of the present invention.
Figure 6:
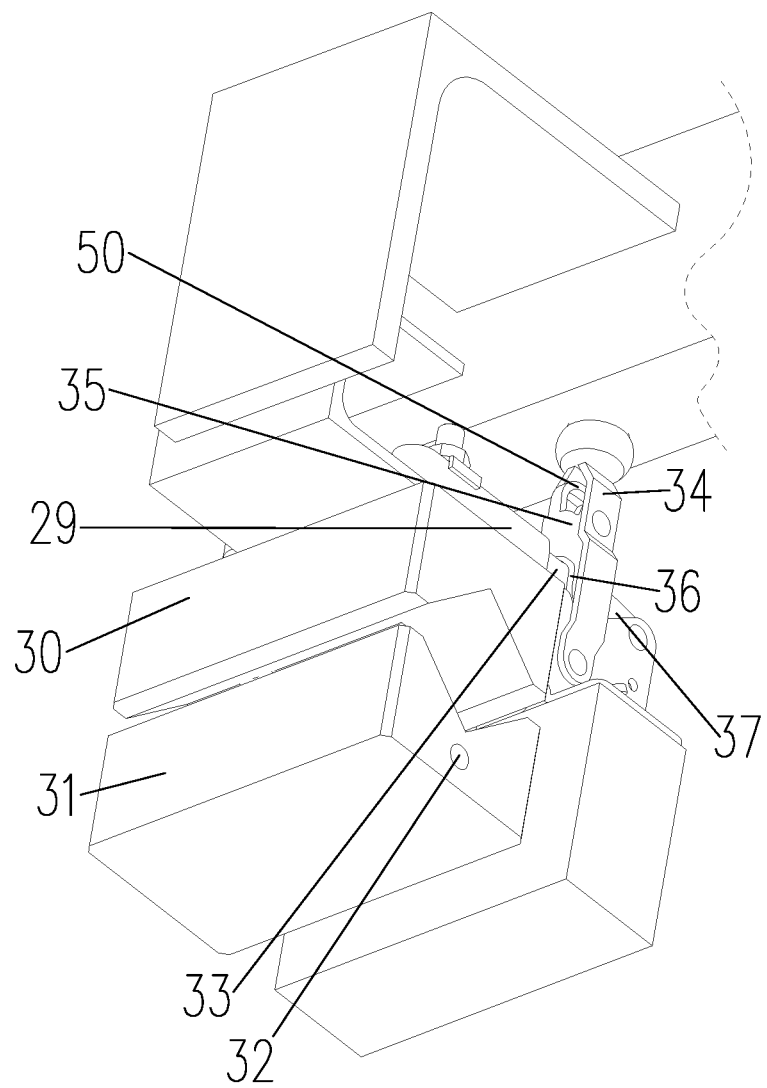
FIG. 6 is a structural illustration of a fifth component of the present invention.
Figure 7:
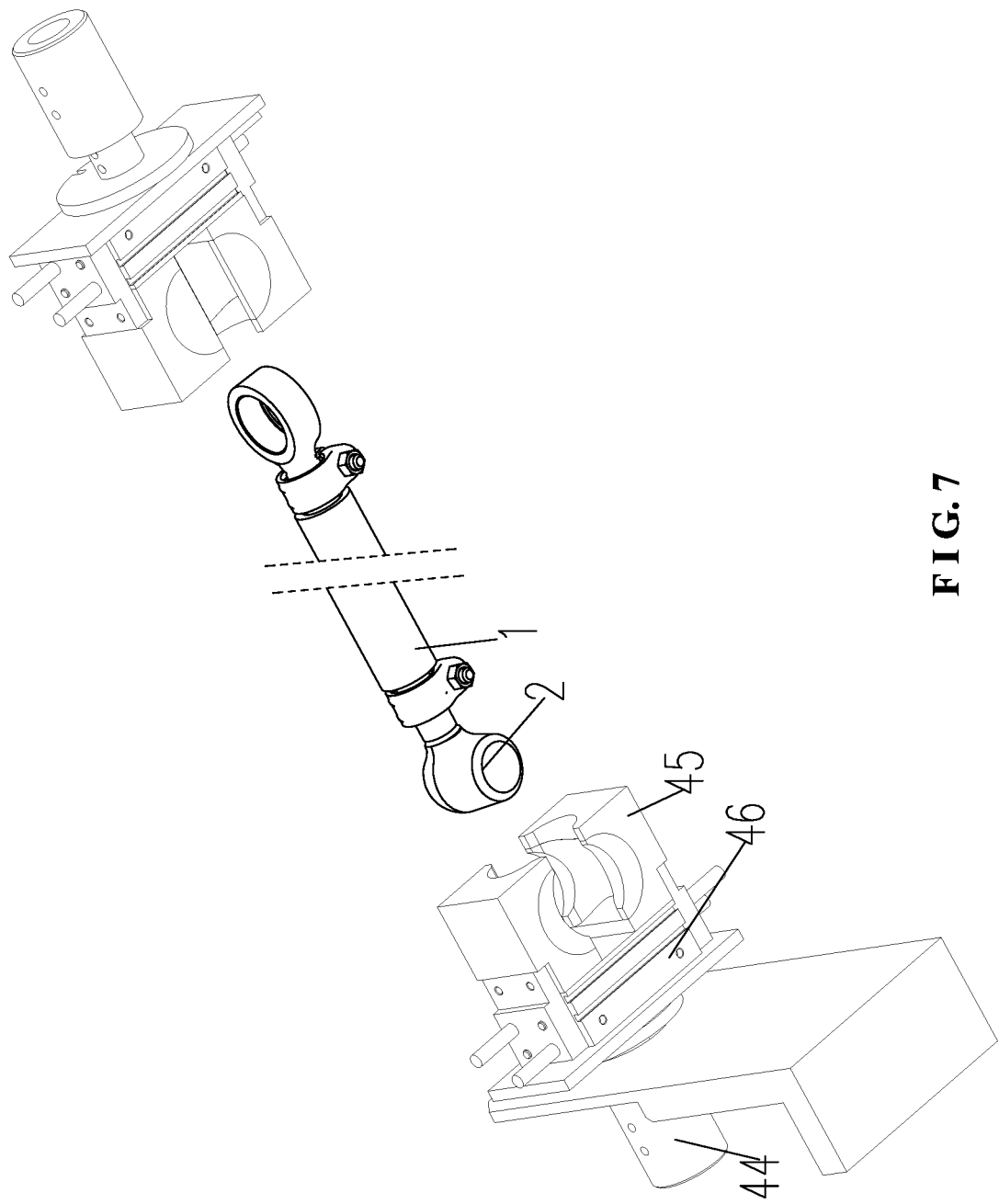
FIG. 7 is a structural illustration of a sixth component of the present invention.

As shown in FIGS. 1-7, according to the present embodiment, a system for assembling dual-head pulling rods is configured to mount pulling heads 2 to two ends of a rod body 1 through threaded connection, and comprises a foundation 3, on which a rod dispensing device 4, an inclined guiding plate 5, a conveying flap 6, a head dispensing device 7, a head mounting unit 8, a clamping device 9, an assembling device 10 and a V-shaped output channel 11 are provided.

The rod dispensing device 4 is configured to dispense rod bodies 1 stored therein one by one by gravity;

The inclined guiding plate 5 uses its ramp to guide the dispensed rod bodies 1.

The conveying flap 6 is swingable between an input position and an output position. At the tilted-up, input position, it receives the rod body 1 from the inclined guiding plate 5 and outputs the rod body 1 to the clamping device 9. At the tilted-down, output position, it receives the assembled rod body 1 from the clamping device 9 and outputs the assembled rod body 1 to the V-shaped output channel 11.

The head dispensing device 7 is configured to dispense the pulling heads 2 stored therein one by one by gravity.

The head mounting unit 8 is configured to receive the pulling head 2 dispensed by the head dispensing device 7 and axially presses the pulling head 2 into the socket in the end of the rod body 1.

The clamping device 9 horizontally clamps the rod body 1.

The assembling device 10 threadedly connects the pulling head 2 to the corresponding end of the rod body 1.

The V-shaped output channel 11 axially pushes the rod body 1 output by the conveying flap 6 to a position for subsequent processing.

The rod dispensing device 4 comprises a rod feeding channel 12, in in which the rod bodies 1 are horizontally placed; rod aligning inclines 13 provided at two sides of the lower end of the rod feeding channel 12; a rod positioning wheel 14 positioned below the lower outlet between the rod aligning inclines 13; U-shaped feeding notches 15 distributed at the circumference of the rod positioning wheel 14 and configured to receive the rod body 1 coining from the rod feeding channel 12; rod orienting lateral walls 16 extending from two sides of the rod positioning wheel 14 to the bottom of the rod positioning wheel 14; a rod orienting falling port 17 located between the rod orienting lateral walls 16 and right below the rod positioning wheel 14 and having a width that is of between one and two times of the diameter of the rod body 1; and a rod angle sensor 18 deposited on the rod positioning wheel 14.

The head dispensing device 7 comprises a downward-open head falling channel 19, in which the pulling heads 2 are placed horizontally; and a head positioning wedge 20 that is installed at the open lower end of the head falling channel 19 in a horizontally extendable manner for preventing the pulling heads 2 from unintentionally falling down.

The head mounting unit 8 comprises a mounting swing motor 21 installed on the foundation 3 and located below the head positioning in wedge 20; a mounting C-shaped bracket 22 linked to the mounting swing motor 21 and configured to receive the pulling head 2 falling down from the head falling channel 19; a mounting access 24 and a mounting front port 25 provided on the mounting C-shaped bracket 22; and an axial pusher 23 axially attached to the mounting C-shaped bracket 22 and configured to axially push the pulling head 2.

Feeding buffer pads 26 are provided at the bottom of the conveying flap 6, and a feeding swing gear shaft 27 is installed on the foundation 3 for driving the conveying flap 6 to swing.

The clamping devices 9, in a number of at least two, each comprise a gripping fixing seat 28 located at the outputting side of the conveying flap 6; a gripping first oscillating arm 33 having its root hinged to the top of the gripping fixing seat 28; a first adjusting arm 29 adjustably attached to the gripping first oscillating arm 33; an upper V-shaped block 30 reversely attached to the below of the end of the first adjusting arm 29; a lower V-shaped block 31 paired to the upper V-shaped block 30 from below; a driving shaft 32 installed on the foundation 3 for driving the lower V-shaped block 31 to turn; a second driving arm 34 mounted on the gripping first oscillating arm 33 and having its root hinged to the gripping fixing seat 28; a third pressing arm 35 having its upper end hinged to the upper end of the second driving arm 34 and located in the chamber of the second driving arm 34; a gripping third hook 50 attached to the top of the third pressing arm 35 to embrace the hinging shaft of the third pressing arm 35; a third n-shaped opening 36 provided at the lower end of the third pressing arm 35, and mounted on the gripping first oscillating arm 33, with its lower end hinged to the gripping first oscillating arm 33; a check-mark-shaped trough 37 installed on the gripping first oscillating arm 33 and matching the curved bottom of the third n-shaped opening 36; a gripping swing seat 38 attaching to the upper end of the second driving arm 34; a gripping front hooked arm 39 attaching to the gripping swing seat 38; an upper pressing hand 40 and a lower hooked hand 41 attached to the gripping front hooked arm 39 and located above and below the first adjusting arm 29, respectively; an orienting sector rack 42 located at one end of the gripping swing seat 38; and a driving gear shaft 43 engaged with the orienting sector rack 42.

The upper V-shaped block 30 and the lower V-shaped block 31 are configured to be drawn together to hold the rod body 1.

When the gripping swing seat 38 swings forward, the upper pressing hands 40 presses the first adjusting arm 29 downward.

When the gripping swing seat 38 swings backward, the lower hooked in hand 41 props up to tilt up the first adjusting arm 29.

The assembling device 10 comprises rotatable push rods 44 located at two ends of the clamping devices 9; assembling squeezing cylinders 46 radially deposited on the rotatable push rods 44; and assembling semi-circular jaw halves 45 attached to the assembling squeezing cylinders 46 for holding the pulling head 2 when being drawn together.

An output axial push rod 47 is provided at one end of the V-shaped output channel 11 for pushing out the assembled rod body 1. An output guide rail 48 is provided at the opposite end of the V-shaped output channel 11, and output trays 49 are guided by a conveyer/chain so as to move along the output guide rail 48.

The output trays 49 are for carrying the rod bodies 1.

According to the present embodiment, a method for assembling dual-head pulling rods comprises the following steps:

Step 1: the rod dispensing device 4 dispensing the rod bodies 1 stored therein one by one by gravity, and the head dispensing device 7 dispensing the pulling heads 2 stored therein one by one by gravity;

Step 2: the inclined guiding plate 5 using a ramp thereof to guide the dispensed rod bodies 1;

Step 3: the conveying flap 6, at a tilted-up input position thereof, receiving and conveying each of the rod bodies 1 guided thereto by the inclined guiding plate 5 to the clamping devices 9;

Step 4: first, the head mounting unit 8 receiving the pulling heads 2 dispensed by the head dispensing device 7; then the head mounting unit 8 receiving the rod bodies 1 coming from the conveying flap 6; secondary, theis head mounting unit 8 axially pushing the pulling heads 2 to corresponding sockets inlaid in the ends of each of the rod bodies 1; and the head mounting unit 8 departing from the pulling heads 2 while the rod body 1 advancing to the clamping devices 9 along the conveying flap 6;

Step 5: the clamping devices 9 horizontally clamping opposite laterals of the rod body 1;

Step 6: the assembling device 10 threadedly connecting the pulling heads 2 to the ends of the rod body 1;

Step 7: the clamping devices 9 releasing the rod body 1, and the conveying flap 6, at a tilted-down position thereof, receiving the rod body 1 with the pulling heads 2 attached thereto on the clamping devices 9 and output the rod body 1 to the V-shaped output channel 11; and Step 8: the V-shaped output channel 11 axially advancing the rod body 1 output by the conveying flap 6 to a position for subsequent processing.

the Step 1 comprises steps of: first, the rod body 1 being horizontally in placed in a rod feeding channel 12; then a rod positioning wheel 14 being activated, and a rod angle sensor 18 controlling the rod positioning wheel 14 to rotate for an angle, so that the rod body 1 rolls from rod aligning inclines 13 to one of plural U-shaped feeding notches 15; and secondary, the rod body 1 being guided by rod orienting lateral walls 16 to be dispensed through a rod orienting falling port 17 by gravity;

the Step 4 comprises steps of:

Step 41: a swing motor 21 controlling a mounting access 24 to be open upward;

Step 42: a head positioning wedge 20 controlling the pulling heads 2 to be dispensed one by one by gravity to a mounting C-shaped bracket 22 from a head falling channel 19;

Step 43: the swing motor 21 controlling the mounting access 24 to face a feeding direction of the rod bodies 1, so that the rod body 1 rolls and falls into the mounting C-shaped bracket 22;

Step 44: an axial pusher 23 axially pushing the pulling head 2 to the socket in the corresponding end of the rod body 1;

Step 45: the swing motor 21 controlling the mounting access 24 to face the clamping device 9; and Step 46: the rod body 1 advancing on the conveying flap 6 to the clamping devices 9;

the Step 5 comprises steps of:

Step 51: a driving shaft 32 driving a lower V-shaped block 31 to turn to receive the rod body 1 and then turn back;

at Step 52, a driving gear shaft 43 driving an orienting sector rack 42 to swing forward, so that an upper pressing hand 40 presses a first adjusting arm 29 downward, and a gripping swing seat 38 driving a second driving arm 34 to swing and become upright that in turn drives a third pressing arm 35 to swing, such that a third n-shaped opening 36 has a curved bottom thereof sliding along a check-mark-shaped trough 37 until the third n-shaped opening 36 becomes upright, thereby making the upper V-shaped block 30 and the lower V-shaped block 31 horizontally clamp the opposite laterals of the rod body 1;

at the Step 6, first, an assembling squeezing cylinder 46 drawing two assembling semi-circular jaw halves 45 together to hold the pulling heads 2; and then a rotatable push rod 44 rotating to threadedly connecting the pulling head 2 to the corresponding end of the rod body 1;

at the Step 7, first, after the gripping swing seat 38 swings, a lower in hooked hand 41 propping up to tilt up the first adjusting arm 29, and the gripping swing seat 38 driving the second driving arm 34 and in turn the third pressing arm 35 to swing, such that the curved bottom of the third n-shaped opening 36 slides along the check-mark-shaped trough 37, thereby making the upper V-shaped block 30 and the lower V-shaped block 31 release the rod body 1; then the driving shaft 32 driving the lower V-shaped block 31 to turn to output the assembled rod body 1; secondary, the conveying flap 6, at the tilted-down position thereof, outputting the assembled rod body 1 to the V-shaped output channel 11; and at the Step 8, first, an output axial push rod 47 axially advancing the rod body 1 from the V-shaped output channel 11 to an output tray 49; and then a conveyer/chain carrying the output tray 49 to the position for subsequent processing.

The present invention realizes automated feeding, aligning, assembling and outputting of the rod body 1 and the pulling heads 2. The operation is efficient and the structure is convenient, with the foundation 3 serving as a support, the rod dispensing device 4 working for storage and automated dispensing, the inclined guiding plate 5 working for guidance, the conveying flap 6 switching between the input position and the output position, the head dispensing device 7 working for storage and automated dispensing, the head mounting unit 8 installing the heads in position, the clamping devices 9 providing automated positioning and clamping, the assembling device 10 performing threaded connection, the V-shaped output channel 11 enabling self-positioning, the rod feeding channel 12 providing guided falling, the rod aligning inclines 13 working for orientation and positioning, the rod positioning wheel 14 allowing the rod bodies to be positioned and output one by one, the U-shaped feeding notches 15 clamping workpieces, the rod orienting lateral walls 16 providing guidance, the rod orienting falling port 17 allowing the rod bodies to be centered and fall down, the rod angle sensor 18 facilitating rotation and positioning control, the head falling channel 19 allowing the heads to fall, the head positioning wedge 20 working for positioning, the mounting swing motor 21 driving swing, and the mounting C-shaped bracket 22 being well designed that it uses the axial pusher 23, the mounting access 24, and the mounting front port 25 to hold the input material and guide the output material. The invention features for sophisticated construction, simple structure, and reasonable design. The feeding buffer pads 26 provide support while reducing vibration. The feeding swing gear shaft 27 driving swing. The gripping fixing seat 28 provides support. The present invention uses the first adjusting arm 29, the upper V-shaped block 30, the lower V-shaped block 31, the driving shaft 32, the gripping first oscillating arm 33, the second driving arm 34, the third pressing arm 35, the third n-shaped opening 36, the check-mark-shaped trough 37, the gripping swing seat 38, the gripping front hooked arm 39, the upper pressing hands 40, the lower hooked hand 41, the orienting sector rack 42, and the driving gear shaft 43 to drive automated swing, uprighting, pressing, locking and positioning.

The rotatable push rods 44, the assembling semi-circular jaw halves 45, the and assembling squeezing cylinders 46 enable assembling through threaded connection. The output axial push rod 47, the output guide rail 48, and the output tray 49 facilitating automated connection to subsequent processing.

The detailed description provided above are for sufficient disclosure of the present invention, and details as known in the art are omitted herein for conciseness.

At last, it is to be noted that the embodiments discussed above are merely for illustrating the technical schemes of the present invention but not forming limitations thereto. While the present invention has been described in detail with reference to the preferred embodiments, people of in ordinary skill in the art shall appreciate that modification may be made to the technical schemes as described in the foregoing embodiments, and some technical features thereof may be substituted by equivalents. Moreover, various combination of the technical schemes of the present invention are apparent to people skilled in the art. All these modifications and substitutions may be made without departing the technical schemes from the spirit and scope of the technical schemes of the embodiments of the present invention.

What is claimed is:

1. A method for assembling dual-head pulling rods, using a dual-head pulling rod assembling system to mount pulling heads at two ends of a rod body of each said dual-head pulling rod through threaded connection, the system comprising: a foundation, on which a rod dispensing device, an inclined guiding plate, a conveying flap, a head dispensing device, a head mounting unit, a clamping device, an assembling device and a V-shaped output channel are installed, and the method comprising steps of:

Step 1: the rod dispensing device dispensing said rod bodies stored therein one by one by gravity, and the head dispensing device dispensing said pulling heads stored therein one by one by gravity;

Step 2: the inclined guiding plate using a ramp thereof to guide the dispensed rod bodies;

Step 3: the conveying flap, at a tilted-up input position thereof, receiving and conveying each said rod body guided thereto by the inclined guiding plate to the clamping device;

Step 4: first, the head mounting unit receiving the pulling heads dispensed by the head dispensing device; then the head mounting unit receiving the rod bodies coining from the conveying flap; second, the head mounting unit axially pushing the pulling heads to corresponding sockets inlaid in the ends of each said rod body; and the head mounting unit departing from the pulling heads while each said rod body advances to the clamping device along the conveying flap;

Step 5: the clamping device horizontally clamping opposite laterals of each said rod body;

Step 6: the assembling device threadedly connecting the pulling heads to the ends of each said rod body;

Step 7: the clamping device releasing each said rod body, and the conveying flap, at a tilted-down position thereof, receiving each said rod body with the pulling heads attached thereto on the clamping device and outputting each said rod body to the V-shaped output channel; and Step 8: the V-shaped output channel axially advancing each said rod body output by the conveying flap to a position for subsequent processing.

2. The method of claim 1, comprising:

said Step 1 comprising steps of: first, each said rod body being horizontally placed in a rod feeding channel; then a rod positioning wheel being activated, and a rod angle sensor controlling the rod positioning wheel to rotate for an angle, so that each said rod body rolls from rod aligning inclines to one of plural U-shaped feeding notches; and second, each said rod body being guided by rod orienting lateral walls to be dispensed through a rod orienting falling port by gravity;

said Step 4 comprising steps of:

Step 41: a swing motor controlling a mounting access to be open upward;

Step 42: a head positioning wedge controlling the pulling heads to be dispensed one by one by gravity to a mounting C-shaped bracket from a head falling channel;

Step 43: the swing motor controlling the mounting access to face a feeding direction of the rod bodies, so that each said rod body rolls and falls into the mounting C-shaped bracket;

Step 44: an axial pusher axially pushing each pulling head to a respective socket in the corresponding end of each said rod body;

Step 45: the swing motor controlling the mounting access to face the clamping device; and Step 46: each said rod body advancing on the conveying flap to the clamping device;

said Step 5 comprising steps of:

Step 51: a driving shaft driving a lower V-shaped block to turn to receive each said rod body and then turn back;

Step 52: a driving gear shaft driving an orienting sector rack to swing forward, so that an upper pressing hand presses a first adjusting arm downward, and a gripping swing seat driving a second driving arm to swing and become upright that in turn drives a third pressing arm to swing, such that a third opening has a curved bottom thereof sliding along a trough until the third opening becomes upright, thereby making an upper V-shaped block and the lower V-shaped block horizontally clamp the opposite laterals of each said rod body;

at said Step 6, first, an assembling squeezing cylinder drawing two assembling semi-circular jaw halves together to hold the pulling heads; and then a rotatable push rod rotating to threadedly connect each pulling head to the corresponding end of each said rod body;

at said Step 7, first, after the gripping swing seat swings, a lower hooked hand propping up to tilt up the first adjusting arm, and the gripping swing seat driving the second driving arm and in turn the third pressing arm to swing, such that the curved bottom of the third opening slides along the trough, thereby making the upper V-shaped block and the lower V-shaped block release each said rod body; then the driving shaft driving the lower V-shaped block to turn to output each assembled rod body; second, the conveying flap, at the tilted-down position thereof, outputting each assembled rod body to the V-shaped output channel; and at said Step 8, first, an output axial push rod axially advancing each said rod body from the V-shaped output channel to an output tray; and then a conveyor or chain carrying the output tray to the position for subsequent processing.

* * * * *